United States Patent [19]
Landi et al.

[11] 3,932,370
[45] Jan. 13, 1976

[54] POWDERED RUBBER

[75] Inventors: Vincent R. Landi, Chesire; Richard W. Tomlinson, Watertown, both of Conn.

[73] Assignee: Uniroyal Inc., New York, N.Y.

[22] Filed: Jan. 15, 1974

[21] Appl. No.: 433,616

[52] U.S. Cl. .............. 260/83.3; 260/85.1; 260/92.3; 260/94.7 HA; 260/96 HA; 260/821
[51] Int. Cl.² ...................... C08D 5/02; C08D 5/04
[58] Field of Search .......... 260/83.3, 85.1, 94.7 HA, 260/96 HA, 821, 92.3; 450/37.11, 37.14

[56] References Cited
UNITED STATES PATENTS

| | | | |
|---|---|---|---|
| 2,470,952 | 5/1949 | Remy | 260/85.1 |
| 2,586,124 | 2/1952 | van Amerongen | 260/83.3 |
| 2,609,365 | 10/1952 | Scott | 260/92.3 |
| 3,100,762 | 8/1963 | Schockney | 260/92.8 |
| 3,397,174 | 8/1968 | Parker et al. | 260/45.9 |

FOREIGN PATENTS OR APPLICATIONS 45-22,621 7/1970 Japan ............. 260/94.7 HA

*Primary Examiner*—William F. Hamrock
*Attorney, Agent, or Firm*—James J. Long

[57] ABSTRACT

Rubber, e.g., butadiene-acrylonitrile copolymer rubber, in readily friable or free flowing powdered form is prepared by halogenating (e.g., chlorinating) the rubber in particulate form in an aqueous medium. Sodium hypochlorite/acid or chlorine water may be used as the chlorinating agent. Preferred bound chlorine content of the treated rubber is at least 0.1%.

17 Claims, No Drawings

POWDERED RUBBER

This invention relates to a method of preparing powdered rubber, and to powdered rubber produced by such method.

There are certain advantages in providing a rubber in the form of friable particles or free flowing powder, as opposed to bales. A friable or powdery, pourable, particulate rubber is easier to handle than bales and is especially desirable for use in continuous manufacturing processes. Conventional techniques for preparing elastomers in powdered form involve grinding, spray drying or coagulation with a partitioning agent. Unfortunately, these conventional methods are expensive and in some cases detrimental to polymer properties.

In accordance with the present invention it has now been found that rubber, e.g., butadiene-acrylonitrile copolymer rubber, can be prepared as a friable or free flowing, non-cohering powder by a method involving halogenation of the rubber in particulate form. As is well known, rubbers such as butadiene-acrylonitrile copolymer rubber (which usually contains from about 18% to about 44% of acrylonitrile, by weight) are conventionally prepared as a latex by an emulsion polymerization process; such latex contains the solid rubber in discrete particulate form, dispersed in an aqueous medium. The invention is practiced by halogenating of the particles, usually after flocculating the latex. As a result of the halogenation treatment, particularly as chlorination treatment, the particles acquire non-cohering properties, and can be recovered as a dry, free flowing powder.

The halogenation of the butadiene-acrylonitrile rubber or other rubber particles is suitably accomplished by treatment with a chlorinating agent such as hypochlorous acid or chlorine water. To bring about the chlorination, the aqueous slurry of rubber particles and the chlorinating agent are brought together and the mixture is agitated.

The hypochlorous acid chlorinating agent is conveniently provided by reacting sodium hypochlorite and an acid (e.g., acetic acid, hydrochloric acid, sulfuric acid, propionic acid, phosphoric acid, nitric acid, malonic acid, maleic acid, etc.). The sodium hypochlorite and the acid may be premixed prior to adding to the slurry of butadiene-acrylonitrile copolymer rubber particles, or the hypochlorous acid chlorinating agent may be formed in situ in the slurry of butadiene-acrylonitrile copolymer rubber particles by adding sodium hypochlorite and acid to the slurry. Thus, an aqueous solution of sodium hypochlorite may be added to butadiene-acrylonitrile copolymer rubber latex which has been flocculated with salt-acid; the acid remaining in the latex serum reacts with the sodium hypochlorite to provide the hypochlorous acid for chlorinating the copolymer. Alternatively, the butadieneacrylonitrile copolymer rubber particles may be separated from the serum and re-slurried with water to which sodium hypochlorite/acid is added to effect chlorination. As indicated, chlorine water may be used as an alternative chlorinating agent in place of sodium hypochlorite/acid. Chlorination will occur whether the serum is present or not. Although the latex is usually flocculated prior to addition of the chlorinating agent, this is not essential. It is not necessary to heat the reaction mixture and although elevated temperature may be employed (e.g., 60°C.) ambient room temperature conditions are preferred, for convenience and economy.

It is surprisingly found that the butadieneacrylonitrile copolymer rubber particles subjected to the chlorination treatment in accordance with the invention do not cohere but remain in friable or freeflowing form, in contrast to untreated butadiene-acrylonitrile copolymer rubber particles, which cohere immediately after flocculation. The tendency of the particles to cohere may be demonstrated by a coherence test performed as follows: 20 g of polymer particles are placed in a 100 ml beaker and weighed down with a 500 g weight, resulting in an average pressure of 50 g/cm$^2$ on the particles. This pressure is maintained for 24 hours at room temperature after which the flow properties of the particles are observed to determine (1) whether the particles stick together and cannot be separated without using considerable manual force (this sticking behavior is designated coherence condition S) or (2) whether the particles cling together but can readily be separated (this friable condition is designated coherence condition F), or (3) whether the particles are free flowing (this free flowing state is designated coherence conditon FF). The free flowing particles (coherence condition FF) represent the preferred practice of the invention. Less preferred are particles which cling together but are friable and can readily be separated (coherence condition F).

The treatment process of the invention, in addition to providing bound chlorine in the butadieneacrylonitrile copolymer rubber (at least 0.05%, preferably at least 0.1% bound chlorine by weight of the copolymer), also typically results in an increase in the gel content of the copolymer. Both of these effects are believed to result from reaction of the particles of butadiene-acrylonitrile copolymer rubber with the chlorinating agent largely at the surface of the particles. The chlorinating agent in the aqueous phase begins to react at the butadieneacrylonitrile rubber surface and the reaction proceeds into the rubber particles as the chlorinating agent diffuses into the rubber phase. The surface reaction is believed to impart the free flowing (non-sticking) characteristics to the rubber particles. The extent of chlorination will vary with a number of factors, including the particular butadiene-acrylonitrile copolymer rubber employed, the nature and concentration of the chlorinating agent selected, the duration of the contact between the chlorinating agent and the rubber particles, and the surface area of the rubber particles. Small particles of butadiene-acrylonitrile copolymer rubber provide large surface area and usually require proportionately a greater percentage of bound chlorine to provide the best anti-sticking properties. The bound chlorine content of the treated polymer should not be greater than 14%, preferably not greater than 5%, by weight. Frequently a butadiene-acrylonitrile copolymer rubber which has a high gel content before chlorination will require less chlorine per unit of surface area to render the particles free flowing.

The extent of increase in gel in the butadieneacrylonitrile copolymer during the chlorination varies considerably depending on the chlorinating reagent. In some applications this increase in gel is desirable. The gel data given herein are obtained by extracting a sample of the rubber with methyl ethyl ketone as the solvent, for 24 hours at room temperature; the gel is the insoluble portion and is expressed as a percentage based on the weight of the sample. Although the gel content of the treated copolymer rubber may be as high as 95%, preferred products will have a gel content not higher than 55%. The treated rubber does not become a resinous, non-elastomeric substance, but retains the characteristics of a vulcanizable rubber and is capable of being cured to an elastomeric state having good physical properties.

Increasing chlorine content of the treated butadiene-acrylonitrile copolymer rubber is ordinarily associated with a decrease in the processability of the rubber. The presence of gel can also affect the viscoelastic properties of the uncured rubber. Processability can be evaluated by determining the film forming characteristics of the copolymer rubber. For this purpose a powdered rubber sample may be pressed at 300°F. and 10,000 psi in a hydraulic press. If a smooth, unbroken film is formed in the pressed film test, this indicates ease of massing in rubber mixing equipment and facile flow under a mixing deformation. Usually up to 55% gel very smooth films are formed. However, in certain applications products with higher gel levels and products which do not form a continuous film in the described pressed film test are still useful.

The interrelated variables, bound chlorine content, surface area of the particles, and gel content, may be used to establish a function, herein referred to as the flow number, FN, which defines the most preferred form of the invention as follows:

$$FN = \frac{Cl}{SA} + \left[\frac{1.67}{100} \times \% \text{ gel}\right]$$

where FN is the "flow number", Cl is the bound chlorine content of the treated butadiene-acrylonitrile copolymer rubber, expressed as grams of chlorine per gram of rubber, SA is the surface area of the particles expressed in square meters per gram, and the gel content is as described previously. (The surface area of the particles may be calculated by standard mathematical procedure, from the observed particle size distribution of a sample of the treated copolymer.) The preferred practice of the invention is represented by the products in which the flow number, FN, as defined, as a value of at least 1.7, most preferably from 2.1 to 12.

The treating process of the invention is not only an economical and efficient way of rendering the butadiene-acrylonitrile copolymer rubber in friable or free flowing powder form, but it is also capable of providing improved properties in a final vulcanizate, compared to a vulcanizate prepared from the same copolymer that has not been subjected to the chlorination treatment of the invention.

The following examples, in which all quantities are expressed by weight unless otherwise indicated, will serve to illustrate the practice of the invention in more detail.

In the examples, several different butadieneacrylonitrile copolymer rubbers are employed, identified as follows:

NBR-I 35% acrylonitrile Mooney viscosity 65 (ML-4 at 212°F.) gel nil
NBR-II 33% acrylonitrile Mooney viscosity 50 gel nil
NBR-III 33% acrylonitrile Mooney viscosity 55 85% gel The Examples employ basically four different modes of chlorination as follows:

Mode A, addition of sodium hypochlorite and acetic acid to a slurry of flocculated particles.

Mode B, addition of sodium hypochlorite and hydrochloric acid to a slurry of flocculated particles.

Mode C, addition of chlorine water to a slurry of flocculated particles.

Mode D, addition of sodium hypochlorite and acetic acid to non-flocculated latex.

EXAMPLE 1

The butadiene-acrylonitrile copolymer rubber employed in this example is NBR-I identified above. 500 g of a latex (24% solids) of this copolymer is charged to a one quart blender. To cream the latex, 58.0 g of a 25% aqueous solution of sodium chloride is added to the latex at room temperature and the mixture is stirred for one minute. To flocculate the creamed latex, it is added slowly to a solution of 50 ml glacial acetic acid in 2000 ml water in a one gallon blender with rapid stirring. The flocculated polymer particles are separated from the serum by filtration through cheesecloth, then washed three times with 2000 ml portions of water. The washed particles 120 g) and 2000 ml of water are added to a gallon blender and stirred rapidly. Chlorinating is undertaken according to Mode A described above by adding simultaneously 15 g of a 14% aqueous solution of sodium hypochlorite and 5 ml glacial acetic acid to the particle slurry and stirring is continued at room temperature (about 23°C.) for 15 minutes. The treated particles are washed three times with 2000 ml portions of water and air dried 48 hours at room temperature. The chlorine content of the product is 0.9%, gel content 50% (measured as indicated above). The surface area of the particles is 0.0031 square meters per gram. The particles are free flowing in the coherence test described above (coherence condition FF), whereas the original unchlorinated particles stick together and cannot be separated (condition S in the coherence test). In the above-described pressed film test the treated particles form a smooth, continuous film. The flow number, FN, calculated as described above, is 3.7. The results of this example and subsequent examples are summarized in Table I, wherein the surface area is expressed as square meters per gram times 10 to the third power.

EXAMPLE 2

The butadiene-acrylonitrile copolymer rubber latex employed in Example 1 is flocculated and chlorinated as there described, except that the chlorination is effected by Mode B identified above, using 20 g of 14% aqueous sodium hypochlorite and 10 ml of 35% hydrochloric acid. The results are shown in Table I.

EXAMPLE 3

Example 2 is repeated using 80 g of 14% aqeuous sodium hypochlorite and 35 ml of 35% hydrochloric acid, with the results shown in Table I.

EXAMPLE 4

Example 1 is repeated except that the butadienea-crylonitrile copolymer rubber is NBR-III (initial gel content 85%) identified above and the mode A chlorination is carried out using 10 g of 14% aqueous sodium hypochlorite and 5 ml glacial acetic acid, with 80 grams of rubber particles. Results are given in Table I where it will be seen that the gel in the product is 90% and a smooth continuous film is not formed in the pressed film test.

EXAMPLE 5

Example I is repeated using NBR-II, and 80 g of 14% aqueous sodium hypochlorite and 16 ml glacial acetic acid in the Mode A chlorination.

EXAMPLE 6

120 g of flocculated, washed NBR-I particles prepared as in Example 1 are slurried in 500 ml water and charged to a three-liter three-necked flask equipped with a stirrer, condenser and gas dispersion tube, for chlorination according to Mode C. Chlorine gas is added via the dispersion tube into the stirred particle slurry for a period of 10 minutes at room temperature. The rate of chlorine addition is regulated in such manner that no noticeable gas evolution is detected. The treated particles are washed three times with 2000 ml portions of water and air dried for 48 hours at room temperature. Results are shown in Table I.

EXAMPLE 7

This example employs the procedure of Example 2 with NBR-I and chlorination Mode B, 160 g of 14% aqueous sodium hypochlorite and 50 ml of 35% hydrochloric acid.

EXAMPLE 8

Example 7 is repeated, using 5 g of 14% aqueous sodium hypochlorite and 10 ml 35% hydrochloric acid. The treated particles are not free flowing but they can be separated readily (coherence condition F).

EXAMPLE 9

Example 1 is repeated (NBR-I, chlorination Mode A) using 5 g 14% aqueous sodium hypochlorite and 10 ml glacial acetic acid. The product displays coherence condition F.

EXAMPLE 10

Example 4 is repeated (NBR-III, chlorination Mode A), treating 80 g of particles with 2.5 g 14% aqueous sodium hypochlorite and 5 ml glacial acetic acid. The bound chlorine in the product is 0.1%; it has coherence condition F.

EXAMPLE 11

This example employs NBR-I and chlorination Mode D on unflocculated latex. 300 g of the NBR-I latex (24% solids) is added to a one quart blender. While agitating, 75 g of 14% aqueous sodium hypochlorite solution is added to the latex and stirred for one additional minute. The treated latex is added to a one gallon blender with 2000 ml of water. 15 ml of glacial acetic acid is slowly added to the treated latex and stirred at room temperature for about 15 minutes. The resultant particles are washed three times with 2000 ml portions of water and air dried for 48 hours at room temperature. The particles are free flowing, have 89% gel, and do not form a smooth continuous film in the pressed film test.

TABLE I

| Example | Chlorination of Nitrile Rubber | | | | | | | | | | |
|---|---|---|---|---|---|---|---|---|---|---|---|
| | 1 | 2 | 3 | 4 | 5 | 6 | 7 | 8 | 9 | 10 | 11 |
| NBR | I | I | I | III | II | I | I | I | I | III | I |
| Mode of chlorination | A | B | B | A | A | C | B | B | A | A | D |
| % Chlorine | 0.9 | 1.3 | 4.6 | 0.4 | 1.2 | 5.2 | 7.2 | 0.4 | 0.5 | 0.1 | 6.4 |
| % Gel | 50 | 20 | 52 | 90 | 59 | 52 | 58 | 19 | 48 | 88 | 89 |
| Surface Area | 3.1 | 5.9 | 10 | 6 | 11.6 | 14.1 | 6.8 | 2.2 | 4.1 | 5.5 | — |
| Coherence | FF | FF | FF | FF | FF | FF | FF | F | F | F | FF |
| Pressed film | Yes | Yes | Yes | No | No | Yes | No | Yes | Yes | Yes | No |
| FN | 3.7 | 2.5 | 5.5 | 2.2 | 2 | 4.6 | 11.6 | 2.1 | 2 | 1.7 | — |

EXAMPLES 12–14

In these examples, the physical properties of sulfur vulcanizates prepared from butadiene-acrylonitrile copolymer rubber chlorinated in accordance with the invention (Examples 12, 13) are compared to those of a sulfur vulcanizate prepared from the nonchlorinated copolymer (Example 14). The rubber employed in NBR-I, chlorinated in accordance with Mode B using the procedure of Example 2. In Example 12, 10 g 14% aqueous sodium hypochlorite and 7 ml 35% hydrochloric acid are used. In Example 13, 40 g 14% aqueous sodium hypochlorite and 17 ml 35% hydrochloric acid are used. The vulcanization recipe is 100 parts NBR, 50 parts MPC carbon black, 5 parts zinc oxide, 1 part stearic acid, 1 part mercaptobenzothiazole disulfide and 1 part sulfur. Eadch stock is cured 45 minutes at 287°F. The physical properties of the cured polymers are summarized in Table II, wherein the tensile strength and modulus (200%) are expressed in psi, the elongation (at break) in percent, and the hardness is the Shore A hardness.

The data in Table II indicate certain improvements in cured physical properties over the non-chlorinated control (Example 14) especially where tensile strength and modulus are concerned, yet, these chlorinated NBR's (Examples 12 and 13) have free flowing particle characteristics at chlorine and gel levels within the scope of the invention. The non-chlorinated nitrile rubber particles are neither friable nor free flowing.

TABLE II

| | Cure of Nitrile Rubbers | | |
|---|---|---|---|
| Example | 12 | 13 | 14 (control) |
| % Chlorine | 0.7 | 3.3 | nil |
| % Gel | 14 | 29 | nil |
| Coherence | FF | FF | S |
| Tensile | 3430 | 3790 | 3010 |
| Modulus | 970 | 2590 | 620 |
| Elongation | 500 | 290 | 610 |
| Hardness | 79 | 85 | 70 |

Other rubbers that may be employed in the invention include styrene-butadiene copolymer rubber, polychloroprene rubber, and polybutadiene rubber.

We claim:

1. In a method of treating rubber selected from the group consisting of butadiene-acrylonitrile copolymer rubber, styrene-butadiene copolymer rubber, polychloroprene rubber and polybutadiene rubber, wherein the rubber is chlorinated by contacting the rubber in an aqueous medium with hypochlorous acid as a chlorinating agent while agitating the mixture, the said chlorination being continued until the rubber has from 0.05 to 14 percent by weight of chlorine added thereto, the gel content of the thus-treated rubber being not greater than 95% by weight measured in methyl ethyl ketone for 24 hours at room temperature, the thus-treated rubber thereafter being separated from the aqueous medium and dried to provide friable or free-flowing rubber particles, the improvement comprising carrying out the said chlorination step while the said rubber is present as particles in the form of a slurry in the said aqueous medium, the said particles having a surface area of from 0.0022 to 0.0141 square meter per gram.

2. A method as in claim 8 in which the said gel content is not higher than 55% by weight.

3. A method as in claim 8 in which the chlorinated rubber particles remain free flowing when tested for choherency by placing 20 grams of the particles in a 100 ml beaker and weighing down with a 500 g weight for 24 hours at room temperature.

4. A method as in claim 8 in which the chlorinated rubber particles form a smooth continuous film when pressed in a hydraulic press at 300°F. under 10,000 psi pressure.

5. A method as in claim 8 in which the chlorinated rubber particles display a flow number of at least 1.7, the said flow number being given by the expression $$FN = \frac{Cl}{SA} + \left[\frac{1.67}{100} \times \% \text{ gel}\right]$$

wherein FN is the flow number, Cl is the bound chlorine content expressed as grams per gram of particles, SA is the surface area expressed as square meters per gram of particles, and % gel is the gel content of the particles expressed as percent by weight, measured in methyl ethyl ketone for 24 hours at room temperature.

6. A method as in claim 5 in which the flow number is from 2.1 to 12.

7. The product of the method of claim 1.

8. A method as in claim 1 in which the said rubber is butadiene-acrylonitrile copolymer rubber.

9. A method as in claim 8 in which the said aqueous medium is the serum of a latex of the said rubber, the said particles being rubber particles flocculated from the said latex.

10. A method as in claim 9 wherein sodium hypochlorite and an acid are added to the latex to bring about flocculation by the action of the acid and chlorination by the action of hypochlorous acid formed in situ by reaction of the sodium hypochlorite and acid.

11. A method as in claim 8 wherein the hypochlorous acid chlorinating agent is formed in situ in the aqueous medium by adding sodium hypochlorite and an acid thereto.

12. A method as in claim 11 wherein said acid is selected from the group consisting of acetic acid, hydrochloric acid, sulfuric acid, propionic acid, phosphoric acid, nitric acid, malonic acid and maleic acid.

13. A method as in claim 12 wherein said acid is acetic acid.

14. A method as in claim 12 wherein said acid is hydrochloric acid.

15. A method as in claim 8 wherein the hypochlorous acid chlorinating agent is formed in situ in the aqueous medium by introducing chlorine gas thereto.

16. A method as in claim 8 wherein the said rubber in the form of a latex is flocculated, and the resulting flocculated rubber particles are separated from the rubber latex serum and re-slurried in water prior to the chlorination step.

17. An improved method of preparing butadiene-acrylonitrile copolymer rubber in free-flowing powdered form, wherein the improvement comprises the following combination of steps:
   a. providing an aqueous slurry of particles of the butadiene-acrylonitrile copolymer rubber by flocculating a latex of the said rubber, the said particles having a surface area of from 0.0022 to 0.0141 square meter per gram;
   b. chlorinataing the butadiene-acrylonitrile copolymer rubber in the said aqueous slurry by contacting the rubber with hypochlorous acid and agitating the slurry until the bound chlorine content of the butadiene-acrylonitrile copolymer rubber is from 0.1 to 5% by weight, the gel content of the thus-treated rubber being not higher than 55% by weight measured in methyl ethyl ketone for 24 hours at room temperature,
   c. thereafter separating the resulting chlorinated butadiene-acrylonitrile copolymer rubber particles from the aqueous medium and drying the said particles, the particles of the resulting powder remaining free flowing when tested for coherency by placing 20 grams of the particles in a 100 ml breaker and weighing down with a 500 g weight for 24 hours at room temperature.

* * * * *